Patented Nov. 4, 1930

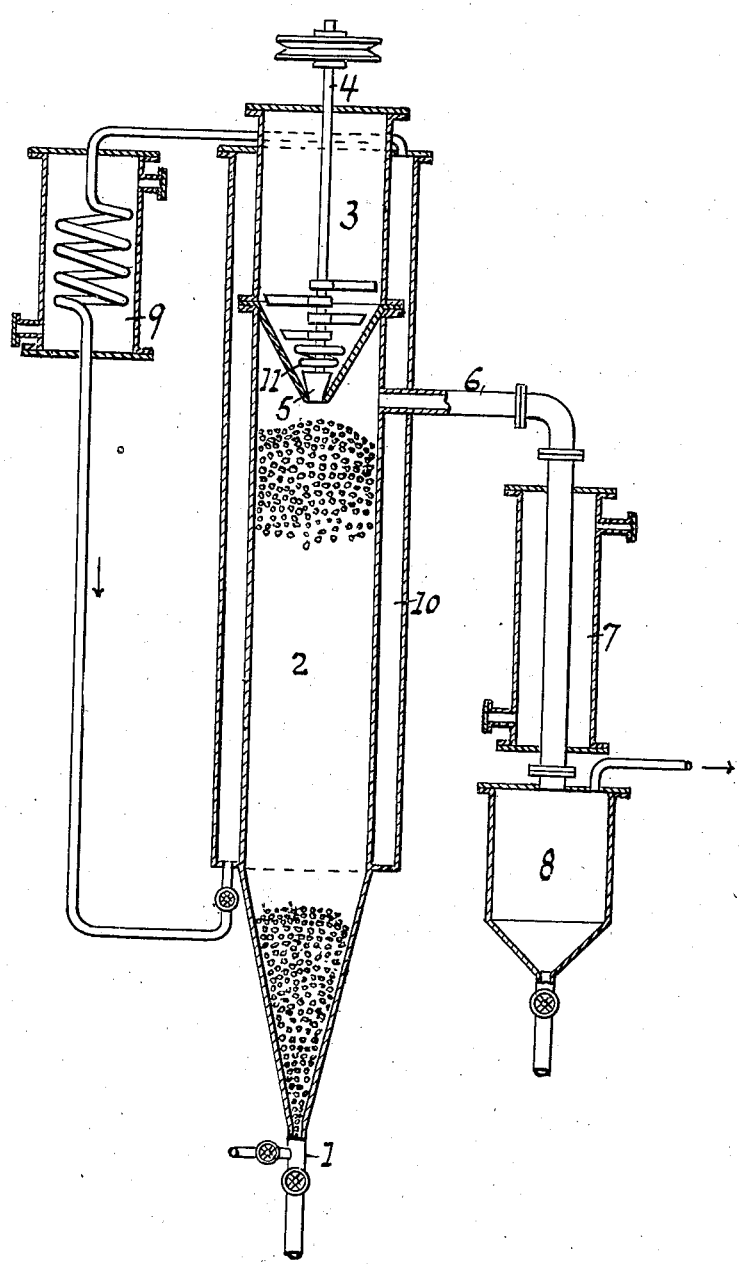

1,780,632

UNITED STATES PATENT OFFICE

WILHELM PUNGS, OF LUDWIGSHAFEN-ON-THE-RHINE, GERMANY, ASSIGNOR TO I. G. FARBENINDUSTRIE (AKTIENGESELLSCHAFT), OF FRANKFORT-ON-THE-MAIN, GERMANY, A CORPORATION OF GERMANY

OXIDATION OF FATS, WAXES, AND RESINS

Application filed October 19, 1925, Serial No. 63,556, and in Germany October 22, 1924.

I have found that valuable products can be obtained by the oxidation of waxes or mixtures thereof with other materials likewise consisting mainly of esters of high molecular weight, such as vegetable or animal oils, fats, or resins by means of a current of a gaseous oxidizing agent containing oxygen, for example air at an elevated temperature and usually between 100 and 200° C. In accordance with my invention, this oxidation is carried out rapidly and in an economical manner when the material to be oxidized is liquefied and mixed with solid bodies of a large superficial area and of any suitable shape unalterable under the conditions of the reaction. Compact bodies having a smooth surface are preferred to porous bodies. They may be indifferent or catalytic substances. As examples of such bodies I mention rings, balls, or otherwise shaped bodies, of clay, glass, earthenware, metal, or metal turnings and the like. Bodies of aluminium or aluminium alloys have been found especially suitable, as these metals are good conductors of heat, and thereby local superheating is avoided, and they do not injuriously influence the color of the products. It is especially advantageous to add such quantities of said bodies as to reach above the surface of the liquid within the reaction vessel when no gas is being blown through it. A gaseous oxidizing agent containing oxygen is introduced into the liquid by one or several nozzles. The liquid is whirled up and a froth is produced so that also the bodies above the surface of the liquid are immersed and become efficient in the reaction. By the use of the filling bodies, the gas is brought into thorough contact with the liquid and no stirrer or other mechanical means are necessary. The waxes, such as lignite wax or peat wax may be oxidized either alone or in mixture with each other or with the aforesaid vegetable or animal oils or fats or higher paraffin hydrocarbons, such as paraffin wax.

By this oxidation process, light-colored, wax-like substances are obtained the properties of which may be varied in accordance with the manner of working. The products differ from the initial materials by their increased flexibility and are plastic when warm. Thus, for example, a product resembling bees wax in its physical properties can be obtained from a mixture of 4 parts of japan wax and 1 part of castor oil. The treatment is interrupted as soon as the acid number of a sample drawn off shows a slight increase above that of the initial material. Though the initial materials possess different melting points in the case of acting upon a mixture of a wax, such as lignite wax, with a vegetable oil or resin, such as China wood oil or colophony, or an animal fat, such as wool grease, the single components cannot be separated after the oxidizing treatment in contrast to the well-known production of linoxyn when the operation is performed in the presence of a vehicle such as paraffin wax, when working according to the present invention also a considerable formation of free fatty acids is avoided, the products possessing an acid number which is not considerably increased in comparison to that of the initial materials. Preferably the oxidation products are cooled rapidly in order to avoid darkening.

The heat developed by the reaction may be employed in any suitable manner, but it is preferred to employ it for preheating a fresh batch of initial material to be oxidized. For example, the reaction vessel may be surrounded by a jacket in which water or any other cooling liquor is vaporized by the heat of the reaction. The steam so produced serves for preheating in a suitable apparatus the matter to be oxidized in the next period of working and generally may afterwards still be used for other purposes.

The following examples will further illustrate some modes of carrying out the invention which however is not restricted to these examples.

*Example 1*

A mixture of equal parts of China wood oil and lignite wax is fused in a high distillation vessel filled with such a quantity of so-called Raschig rings as to rise considerably above the surface of the liquid. The mixture is heated to about 160 degrees to 170 degrees centigrade and a strong current of air introduced into the liquid for 3 hours. A wax-like substance of yellowish color is obtained which possesses an acid number of 3 and is plastic in the warm. Cotton-seed-oil, linseed-oil, sunflower-oil and the like may be employed in the place of China wood oil. The reaction may also be carried out in a tower provided with a cooling jacket and filled with aluminium rings. The reaction goes on for 3 to 4 hours and develops heat which is utilized for the production of steam by squirting water into the jacket. The steam is introduced into a jacket of a melting vessel in which the fats to be used in the next period are fused and preheated. If the fats are to be preheated to temperatures higher than 100 degrees centigrade, for example 160 degrees, water under a pressure of 7 atmospheres or a liquor boiling at about 160 degrees centigrade, for example a tar oil fraction, is squirted into the cooling jacket.

*Example 2*

A mixture of 30 parts of wool fat, 30 parts of linseed-oil and 40 parts of lignite wax is oxidized in the manner described in Example 1. A wax-like substance is obtained which possesses an acid number of 16.8, melts at about 84° C. and can be kneaded by the hand. The process here described may be carried out in any suitable apparatus. One form of a suitable arrangement is shown in vertical section in the accompanying drawing, but any other form may also be employed.

In the drawing, 2 represents the reaction vessel filled with the mixture of the material to be oxidized with solid unattackable bodies. The oxidizing gas is blown in through pipe 1 and passes through the mixture in a finely divided state. The waste gases are withdrawn through pipe 6 and passed through the cooler 7 and the receiving tank 8 in which volatile oxidation products are separated. Above the reaction vessel 2 there is arranged the preheating vessel 3, in which a new charge of initial material is preheated. Both the reaction vessel 2 and the preheating vessel 3 are surrounded by a jacket 10. The heat developed by the reaction is taken up by a heating liquid contained in the jacket 10, which liquid is vaporized and preheats the new charge contained in the preheating vessel 3 and agitated therein by a stirrer 4. The vapor leaving the jacket 10 may be utilized for other purposes or it may be condensed in a cooler 9 and the condensate returned into the jacket 10. The preheating vessel may be provided with a heating device, for example a steam coil 11, if so desired.

When the oxidation is finished, the gas current is stopped and the oxidized product withdrawn through pipe 1. The preheated new charge is introduced into the reaction vessel 2 by the conical valve 5, whereupon the operation is started again.

*Example 3*

A mixture of 20 parts of colophony and 50 parts of lignite wax is oxidized for eight hours in the manner described in Example 1. A substance of waxy consistency is obtained which possesses an acid number of 42 and a melting point of about 86° C. Instead of colophony, other resins such as dammar or mastic may be employed.

I claim:

1. In the process of oxidizing a mixture of fats, oils, waxes and resins by passing therethrough a current of a gaseous oxidizing agent containing oxygen the steps of charging a retort with bodies which are inert to the substances occurring in the reaction and which are excellent conductors of heat, and feeding said mixture into said retort to a point below the top of said inert charge whereby when said mixture swells during the process its increase in volume will be in contact with said inert bodies.

2. The process of oxidizing a mixture of fats, oils, waxes and resins which comprises charging a retort with bodies which are inert to the substances occurring in the process and which are excellent conductors of heat, feeding said mixture into said retort to a point below the top of said inert charge whereby when said mixture swells during the reaction its increase in volume will be in contact with said inert bodies. and passing a strong current of air through said mixture at a temperature between about 160 and 170° C. whereby oxidation is effected.

3. The process of oxidizing a mixture of China wood oil and lignite wax which comprises charging a retort with bodies which are inert to the substances occurring in the process and which are excellent conductors of heat, feeding said mixture into said retort to a point below the top of said inert charge whereby when said mixture swells during the reaction its increase in volume will be in contact with said inert bodies, and passing a strong current of air through said mixture at a temperature between about 160 and 170° C. whereby oxidation is effected.

4. The process of oxidizing a mixture of China wood oil and lignite wax which comprises charging a retort with bodies which are inert to the substances occurring in the process and which are excellent conductors of heat, feeding said mixture into said retort to a point below the top of said inert charge whereby when said mixture swells during the reaction its increase in volume will be in contact with said inert bodies, passing through the said mixture a current of a gaseous oxidizing agent containing oxygen at a temperature between about 160 and 170° C., conserving the heat given off during the reaction and using such heat to preheat said mixture to the temperature of the reaction thereby rendering the process self-supporting thermally.

5. The process of producing wax-like products possessing increased flexibility, which comprises blowing a gaseous oxidizing agent containing oxygen at a temperature between about 160 and 170° C. through a wax and contained in a vessel provided with loose solid bodies with a large superficial area unalterable under the conditions of working, the reaction being stopped as soon as the acid number of a sample is slightly increased.

6. The process of producing wax-like products possessing increased flexibility, which comprises blowing a gaseous oxidizing agent containing oxygen at a temperature between about 160 and 170° C. through a wax and contained in a vessel which is filled with loose solid bodies with a large superficial area unalterable under the conditions of working, said bodies extending considerably above the level of the liquefied initial material, the reaction being stopped as soon as the acid number of a sample is slightly increased.

7. The process of producing wax-like products possessing increased flexibility, which comprises blowing a gaseous oxidizing agent containing oxygen at a temperature between about 160 and 170° C. through a mixture of a wax with another material consisting mainly of esters of a high molecular weight, and contained in a vessel provided with loose solid bodies with a large superficial area unalterable under the conditions of working, the reaction being stopped as soon as the acid number of a sample is slightly increased.

8. A modification of the process claimed in claim 7, which comprises blowing a gaseous oxidizing agent containing oxygen at a temperature between about 160 and 170° C. through a mixture of a wax with higher paraffin hydrocarbons, and contained in a vessel provided with loose solid bodies with a large superficial area unalterable under the conditions of working, the reaction being stopped as soon as the acid number of a sample is slightly increased.

9. The process of producing wax-like products possessing increased flexibility, which comprises blowing a gaseous oxidizing agent containing oxygen at a temperature between about 160 and 170° C. through a wax, and contained in a vessel provided with loose solid bodies with a large superficial area unalterable under the conditions of working, the reaction being stopped as soon as the acid number of a sample is slightly increased and the reaction heat being exchanged to a fresh batch of initial material.

10. The process of producing wax-like products possessing increased flexibility which comprises filling a reaction vessel with loose solid bodies with a large superficial area, unalterable by heat and oxidation products of waxes, feeding a liquefied wax into said vessel to a level below the level of the said bodies and passing a gaseous oxidizing agent containing oxygen at a temperature between about 160 and 170° C. through the said vessel from below, the reaction being stopped as soon as the acid number of a sample is slightly increased.

11. The process of producing wax-like products possessing increased flexibility which comprises filling a reaction vessel with loose solid bodies with a large superficial area, unalterable by heat and oxidation products of waxes, feeding a liquefied mixture of lignite wax with an oily ester of high molecular weight into said vessel to a level below the level of the said bodies and passing air through the said vessel from below at a temperature of about 160° C., the reaction being stopped as soon as the acid number of a sample is slightly increased.

In testimony whereof I have hereunto set my hand.

WILHELM PUNGS.